UNITED STATES PATENT OFFICE.

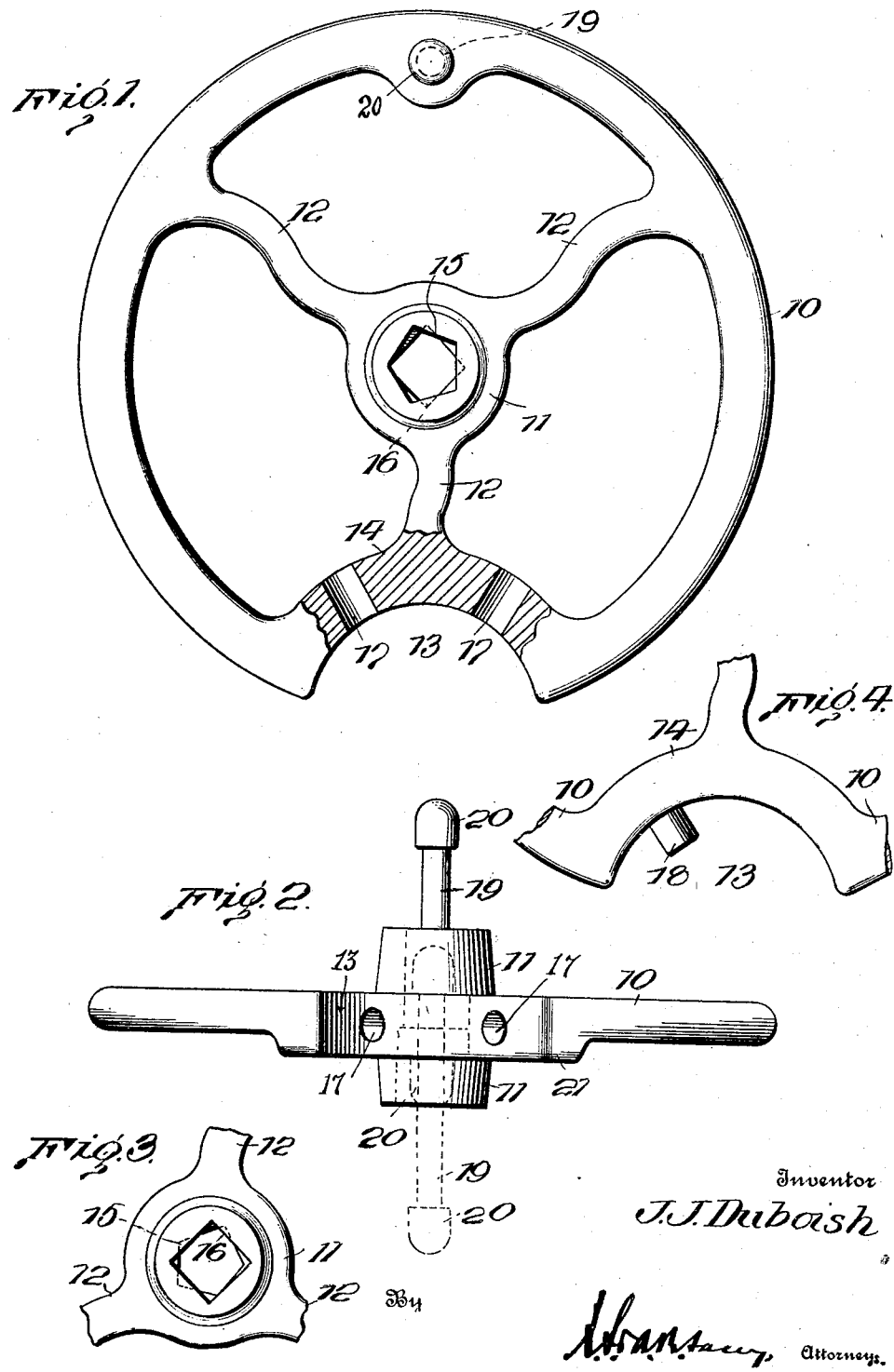

JOHN J. DUBOISH, OF PUEBLO, COLORADO.

FIRE-HYDRANT WRENCH.

1,197,614.  Specification of Letters Patent.  Patented Sept. 12, 1916.

Application filed November 8, 1915. Serial No. 60,311.

*To all whom it may concern:*

Be it known that I, JOHN J. DUBOISH, a citizen of the United States, residing at Pueblo, in the county of Pueblo and State of Colorado, have invented certain new and useful Improvements in Fire-Hydrant Wrenches, of which the following is a specification.

This invention relates to improvements in implements for opening and closing hydrant valves, and also for opening and closing hose couplings, and has for one of its objects to simplify and improve the construction and increase the efficiency and utility of devices of this character.

Another object of the invention is to provide a device of this character whereby both hands of the operator are employed to hold the device in position and to manipulate the same, thus increasing the leverage power and likewise preventing the implement from slipping from the hydrant or from the coupling when force is applied.

Another object of the invention is to provide a device of this character which is applicable without material structural change to hydrant valves or hose couplings of various forms and sizes.

With these and other objects in view, the invention consists in certain novel features of construction as hereinafter shown and described, and then specifically pointed out in the claim; and in the drawings illustrative of the preferred embodiment of the invention: Figure 1 is a side elevation, partly in section, of the improved implement; Fig. 2 is an edge view of the same; Fig. 3 is a detail view of a portion of the implement viewed from the opposite side to that shown in Fig. 1; Fig. 4 is a detail view illustrating a slight modification in the construction.

Corresponding and like parts are referred to in the following description and indicated in all the views of the accompanying drawings by the same reference characters.

The improved implement comprises an annular body 10, and a hub 11 connected to the body by spokes 12. Formed in one side of the body is a recess 13 conforming in outline substantially to the movable portion or member of a hose coupling and bearing partially around the same. The recess 13 is defined by an inwardly curving portion 14 which is integral with the body 10. The hub 11 projects beyond the general side faces of the body and is provided with nut engaging sockets, preferably of different forms and sizes to adapt the device to the turn-studs or nuts of hydrants or like devices. For instance, at one side the socket is five-sided, as shown in full lines in Fig. 1 and designated by the character 15, as fire hydrants are generally formed with the turn-stud or nut of this shape, while the other socket is square, as illustrated in full lines in Fig. 3 and designated by the character 16, to enable the device to be applied to two different forms of nuts or the like.

In Figs. 1 and 2, the member 14 is provided with sockets 17 adapted to engage over the studs which project from the movable member of the hose coupling, when hose couplings of this character are to be acted upon. In Fig. 4 the member 14 is provided with a stud 18 designed to enter the cavities in the movable member of the coupling when couplings of this character are to be operated. The implement may thus be adapted to various forms of couplings without material change or alteration in the device.

Slidably disposed through the member 10 at one side, preferably at the side opposite the recess 13, is a handle member 19 enlarged at the ends, as indicated at 20. The member 19 with its enlarged ends thus forms a movable handle which may be projected from either side of the body 10 to assist the operator in actuating the coupling, either to open or close the same. By forming the member 19 to be moved from side to side of the body, the handle may be adjusted for either hand of the operator, thus materially increasing the convenience and utility of the implement.

It will be noted that the recess or cavity 13 is intermediate the sides of the body 10, consequently, the operator can use both hands in actuating the device and hold the implement firmly in position while operating the same, thus obviating any danger of the implement becoming displaced while in use. Another advantage of the implement is that it enables the operator to open or close the coupling while the hose is lying flatwise upon the ground, and it is not necessary, therefore, to elevate the hose to enable the coupling to be either opened or closed.

The implement may be constructed of any suitable material and of any suitable size and, when not in use, can be carried upon the arm of the operator or suspended from a hook or nail, as will be obvious. The portion 14 of the body and the parts adjacent thereto are increased in thickness as shown at 21 to increase the bearing face of the recess.

Having thus described the invention, what is claimed as new is:

An implement of the class described comprising a body having a recess in one side adapted to bear partly around a hose coupling, means within said recess for engaging the movable member of the coupling, and a handle slidably engaging said body and adapted to be projected from either side thereof to enable the body to be operated in either direction.

In testimony whereof I affix my signature.

JOHN J. DUBOISH. [L. S.]

Copies of this patent may be obtained for five cents each, by addressing the "Commissioner of Patents, Washington, D. C."